(12) United States Patent
Cha et al.

(10) Patent No.: US 8,870,708 B2
(45) Date of Patent: Oct. 28, 2014

(54) DIRECT TYPE DRIVING MODULE OF DIFFERENTIAL GEAR FOR ELECTRIC VEHICLE

(75) Inventors: Hyun Rok Cha, Gwangju (KR); Dae Young Im, Mokpo-si (KR); Tae Won Jeong, Gwangju (KR)

(73) Assignee: Korea Institute of Industrial Technology, Cheonan-Si (KR)

( * ) Notice: Subject to any disclaimer, the term of this patent is extended or adjusted under 35 U.S.C. 154(b) by 0 days.

(21) Appl. No.: 13/639,084

(22) PCT Filed: Dec. 30, 2011

(86) PCT No.: PCT/KR2011/010359
§ 371 (c)(1),
(2), (4) Date: Oct. 2, 2012

(87) PCT Pub. No.: WO2013/094802
PCT Pub. Date: Jun. 27, 2013

(65) Prior Publication Data
US 2013/0281248 A1    Oct. 24, 2013

(30) Foreign Application Priority Data

Dec. 23, 2011   (KR) .................. 10-2011-0141445

(51) Int. Cl.
*F16H 57/08*     (2006.01)
*B60K 17/04*     (2006.01)
*F16H 48/08*     (2006.01)
*F16H 48/06*     (2006.01)
*B60K 1/00*      (2006.01)

(52) U.S. Cl.
CPC ............... *F16H 48/08* (2013.01); *B60K 17/04* (2013.01); *B60K 2001/001* (2013.01); *B60K 1/00* (2013.01); *F16H 48/06* (2013.01)
USPC .......................................... 475/346; 475/230

(58) Field of Classification Search
USPC .......... 384/548, 584; 475/220, 230, 331, 346; 74/640, 650, 405
See application file for complete search history.

(56) References Cited

U.S. PATENT DOCUMENTS

| 1,444,293 | A | * | 2/1923 | White ........................... 475/247 |
| 2,120,594 | A | * | 6/1938 | Alden ........................ 180/24.11 |
| 3,286,647 | A | * | 11/1966 | Lambeth ....................... 74/22 R |
| 4,938,307 | A | * | 7/1990 | Sasaki et al. ................. 180/247 |
| 7,051,619 | B1 | * | 5/2006 | Morgillo ......................... 74/607 |
| 2001/0013440 | A1 | * | 8/2001 | Izumi et al. .................... 180/247 |
| 2003/0106384 | A1 | * | 6/2003 | Yokota et al. ................... 74/424 |
| 2008/0101742 | A1 | * | 5/2008 | Kawaguchi et al. .......... 384/450 |
| 2010/0086248 | A1 | * | 4/2010 | Yamamoto et al. ........... 384/548 |
| 2012/0060647 | A1 | * | 3/2012 | Yamamoto ..................... 74/640 |
| 2012/0234120 | A1 | * | 9/2012 | Fukuda et al. .................. 74/405 |

* cited by examiner

*Primary Examiner* — Justin Holmes
(74) *Attorney, Agent, or Firm* — Lexyoume IP Meister, PLLC

(57) ABSTRACT

Disclosed is a direct-type driving module of a differential gear for an electric vehicle, which is configured to directly connect a driving shaft of a driving motor to a driving bevel gear without a decelerator. In the direct-type driving module according to the present invention, the driving axel of the driving motor is connected to a driving bevel gear geared with the differential gear through a coupler, thereby easily adapting to the change of a driving axel. In addition, a rotator of the driving motor can be prevented from being compressed or applied with a tensile load due to an external force applied to a driving axel installed in a direct-type driving method, thereby increasing durability of the driving motor.

9 Claims, 12 Drawing Sheets

DIRECT TYPE DRIVING MODULE OF DIFFERENTIAL GEAR FOR ELECTRIC VEHICLE

TECHNICAL FIELD

The present invention relates to a direct-type driving module of a differential gear for an electric vehicle, and more particularly, to a direct-type driving module of a differential gear for an electric vehicle, which is configured to directly connect a driving shaft of a driving motor to a driving bevel gear without a decelerator.

BACKGROUND ART

When a motor vehicle runs linearly, both wheels of the motor vehicle are driven at the same rotation speed. However, when the motor vehicle turns a bend in a road, an outer wheel having a larger turning radius rotates faster and further than an inner wheel having a smaller turning radius to achieve smooth turning without slipping. Therefore, the inner and outer wheels are driven at different rotation speeds.

As described above, a differential device is installed at a vehicle axel to transmit power of an engine to wheels and adjusts rotation speeds at opposite wheels differently according to the bad applied to the wheels.

The conventional differential device includes a differential gear that receives the power of a transfer shaft installed at a transmission, a differential case assembled with the differential gear and rotating, a pinion gear rotatably installed at the differential case, a pinion shaft installed to fix the pinion gear to the differential case, and a side gear installed on an output shaft and rotating in gear with the pinion gear.

In the conventional differential device, since a connection part connected to a driving shaft of a driving part is integrally formed with a driving axel, it is difficult to easily adapt to a change in the driving axel. In particular, in a case of recently actively developed electric vehicles using a driving motor, the driving motor may be connected to a driving pinion by a direct-type driving method, a compressive or tensile bad may be applied to a rotator of the driving motor due to an external force generated at the driving axel, which may result in a shorter life of the driving motor.

DISCLOSURE OF THE INVENTION

In order to overcome the above-mentioned shortcomings, the present invention provides a direct-type driving module of a differential gear for an electric vehicle, which can easily adapt to the change of a driving axel by connecting the driving axel of a driving motor to a driving bevel gear geared with the differential gear through a coupler.

The present invention also provides a direct-type driving module of a differential gear for an electric vehicle, which can increase durability of a driving motor by preventing a rotator of the driving motor from being compressed or applied with a tensile load due to an external force applied to a driving axel installed in a direct-type driving method.

According to an aspect of the invention, there is provided a direct-type driving module of a differential gear for an electric vehicle, including a driving bevel gear connected to enable power transmission with respect to a differential gear of a differential device; a coupler having a first connection part provided at one side and a second connection part provided at the other side, the first connection part connected to a driving axel of a driving motor, and the second connection part connected to the driving bevel gear; a first bearing installed at the coupler and having an inner wheel supported to the coupler and an outer wheel supported to a housing of the differential device; a second bearing installed at the driving bevel gear and having an inner wheel supported to the driving bevel gear and an outer wheel supported to a housing of the differential device; and a fastening part connecting the coupler and the driving bevel gear to each other, wherein the first and second bearings are supported to one and the other surfaces of the housing to be mounted at opposite sides facing each other.

The coupler may include a supporting part having a larger diameter than the second connection part so as to install the first bearing between the first connection part and the second connection part, the first connection part and the second connection part have first and second fastening grooves having splines inwardly recessed from ends so as to be coupled to the driving axel and the driving bevel gear, and the fastening part includes a fixing bolt thread-coupled to the driving bevel gear inserted into the second fastening groove from the first fastening groove through bolt fixing holes allowing the first and second fastening grooves to communicate with each other.

In addition, the coupler may include a supporting part having a larger diameter than the second connection part so as to install the first bearing between the first connection part and the second connection part, the first connection part and the second connection part have first and second fastening grooves inwardly recessed from ends so as to be coupled to the driving axel and the driving bevel gear, and the fastening part includes first and second threads formed on inner circumferential surface of the second fastening groove and an outer circumferential surface of a shaft coupling part of the driving bevel gear inserted into the second fastening groove.

In addition, the coupler may include a supporting part having a larger diameter than the second connection part so as to install the first bearing between the first connection part and the second connection part, the first connection part and the second connection part have first and second fastening grooves having splines inwardly recessed from ends of the first connection part and the second connection part so as to be coupled to the driving axel and the driving bevel gear, and the fastening part includes a fixing bolt extending from a shaft coupling part of the driving bevel gear inserted into the second fastening groove through bolt holes allowing the first and second fastening grooves to communicate with each other, and a nut thread-coupled to an end of the fixing bolt and exposed to the first fastening groove via the bolt hole.

The coupler may include a protrusion member inserted into an insertion hole recessed from an end of the second fastening groove to the first fastening groove, extending from a shaft coupling part of the driving bevel gear inserted into the second fastening groove and having a pin insertion hole formed orthogonal to an extending direction of the insertion hole, and a fixing pin for fixing the protrusion member to the coupler while penetrating the coupler in the extending direction of the pin insertion hole so as to penetrate the pin insertion hole of the protrusion member inserted into the insertion hole.

The first bearing and the second bearing may be taper roller bearings and may be tapered such that rollers of the first bearing and the second bearing are away from centers of rotation of the coupler and the driving bevel gear as they extend to be away from the housing.

As described above, in the direct-type driving module of a differential gear for an electric vehicle according to the present invention, the driving axel of the driving motor is connected to a driving bevel gear geared with the differential gear through the coupler, thereby easily adapting to the change of the driving axel. In addition, a rotator of the driving motor can be prevented from being compressed or applied with a tensile load due to an external force applied to a driving axel installed in a direct-type driving method, thereby increasing durability of the driving motor.

BRIEF DESCRIPTION OF THE DRAWINGS

The objects, features and advantages of the present invention will be more apparent from the following detailed description in conjunction with the accompanying drawings, in which.

BEST MODE FOR CARRYING OUT THE INVENTION

Figure 1:
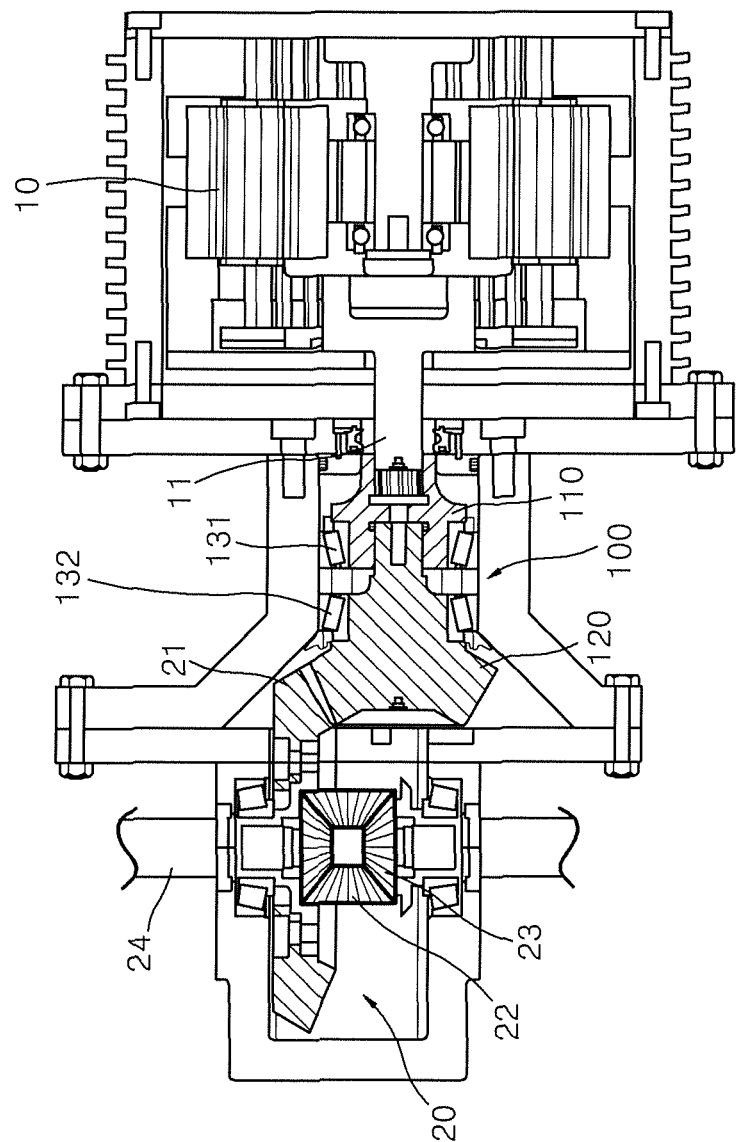
FIG. 1 is a cross-sectional view of a direct-type driving module of a differential gear for an electric vehicle according to the present invention.
Figure 2:
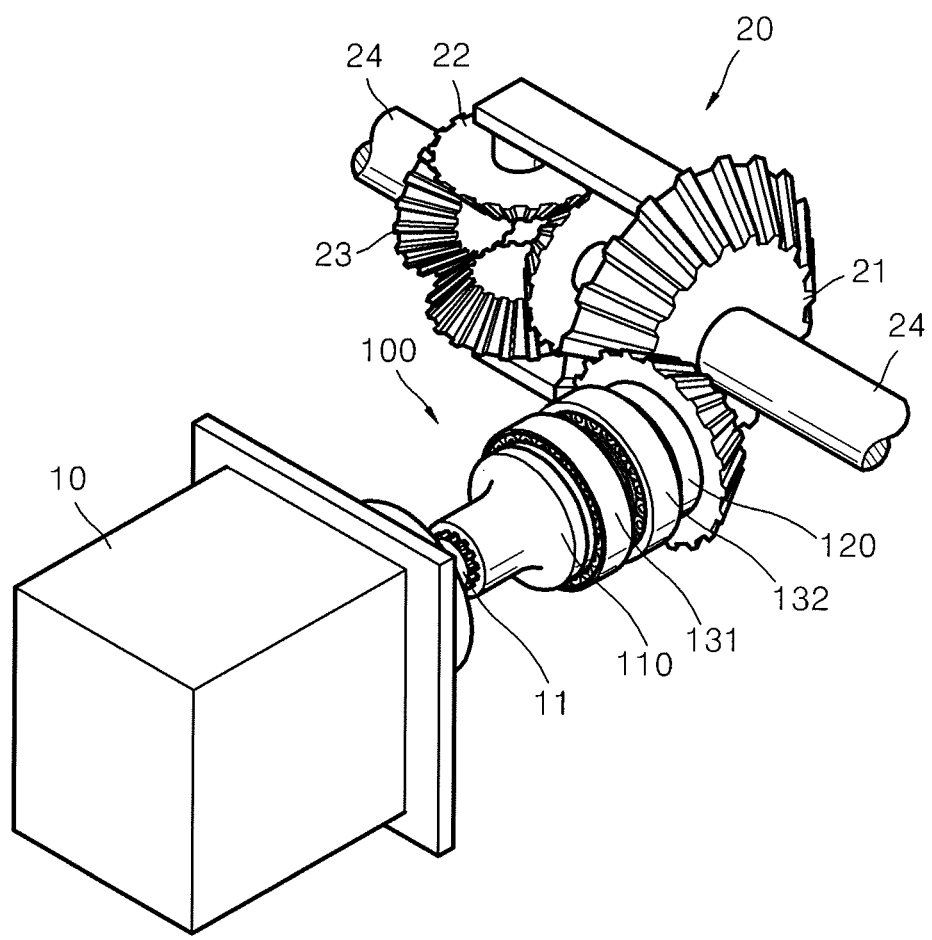
FIG. 2 is a perspective view illustrating a first embodiment of the direct-type driving module shown in FIG. 1.
Figure 3:
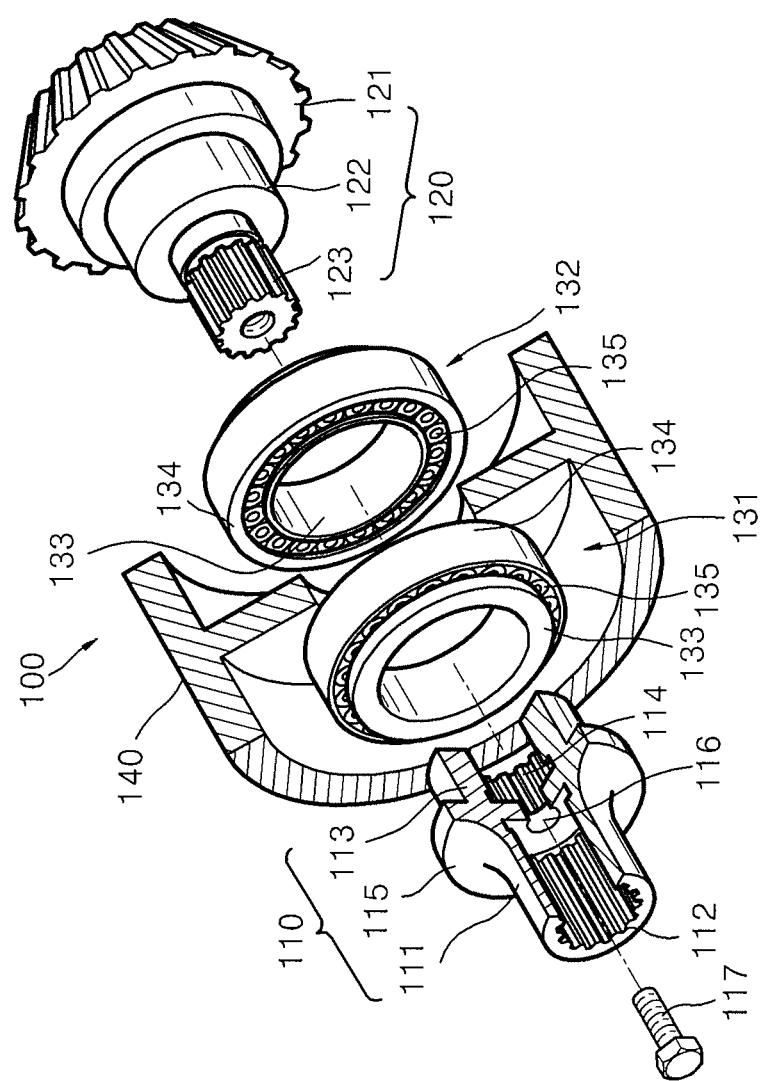
FIG. 3 is an exploded perspective view illustrating the direct-type driving module shown in FIG. 2.
Figure 4:
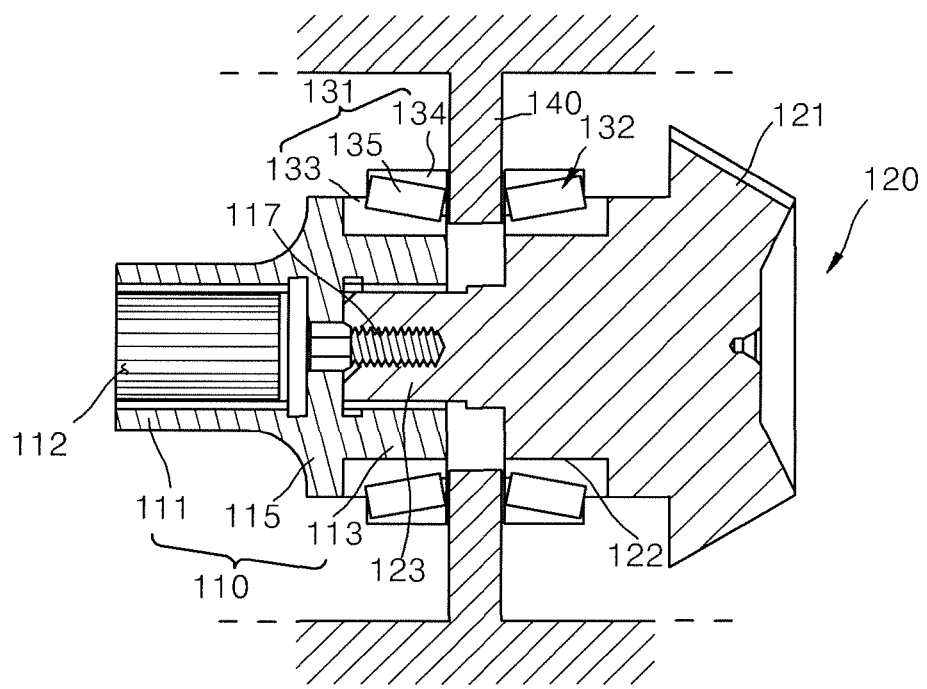
FIG. 4 is a cross-sectional view illustrating the direct-type driving module shown in FIG. 2.

Hereinafter, a direct-type driving module of a differential gear for an electric vehicle according to the present invention (to be briefly referred to as a 'driving module' hereinafter) will be described in detail with reference to the accompanying drawings.

FIGS. 1 to 4 illustrate a preferred embodiment of a direct-type driving module 100 of a differential gear for an electric vehicle according to the present invention.

Referring to FIGS. 1 to 4, the driving module 100 according to the present invention is employed to an electric vehicle and is connected to a driving axel 11 extending from a driving motor 10.

The driving module 100 includes a coupler 110 connected to the driving axel 11 of the driving motor 10, a driving bevel gear 120 connected to a differential gear 21 of a differential device 20, and first and second bearings 131 and 132 connecting the coupler 110 and the driving bevel gear 120 to a housing 140 of the differential device 20 so as to be capable of rotating.

The coupler 110 connects the driving axel 11 of the driving motor 10 to the driving bevel gear 120. The coupler 110 includes a first connection part 111 connected to the driving axel 11 at one end facing the driving axel 11, a second connection part 113 connected to the driving bevel gear 120 at the other end facing the first connection part 111, and a support part 115 formed between the first and second connection parts 111 and 113.

A first fastening groove 112 is formed in the first connection part 111. The first fastening groove 112 is inwardly recessed by a predetermined length along a lengthwise direction from its end so as to allow the driving axel 11 to be inserted.

Splines having recess grooves and protrusion parts alternately arranged along the circumferential direction are formed on an inner circumferential surface of the first fastening groove 112, and splines are also formed on an outer circumferential surface of the first fastening groove 112 to allow the driving axel 11 to be inserted into the first fastening groove 112 so as to enable power transmission.

The second connection part 113 is formed at the other end of the coupler 110 and has the second fastening groove 114 inwardly recessed along the lengthwise direction. Spines are also formed on an inner circumferential surface of the second fastening groove 114 to allow a coupling part of the driving bevel gear 120 to later be described to be inserted and spline-coupled, thereby enabling power transmission from the driving axel 11 to the driving bevel gear 120 through the coupler 110.

The supporting part 115 is formed between the first connection part 111 and the second connection part 113 and has a diameter greater than the second connection part 113. The supporting part 115 supports the first bearing 131 installed on the outer circumferential surface of the second connection part 113, which will later be described. The first fastening groove 112 and the second fastening groove 114 communicate with each other by means of a bolt fixing hole 116.

As described above, the driving bevel gear 120 is coupled to the coupler 110 to rotate differential gear 21 while rotating by a driving force of the driving axel 11. The driving bevel gear 120 includes a gear part 121 geared to the differential gear 21, an extension part 122 extending from an end of the gear part 121 to the coupler 110, and a shaft coupling part 123 extending a predetermined length from an end of the extension part 122.

The gear part 121 is shaped of a general bevel gear and is geared to the differential gear 21. Like in the general differential device 20, the differential gear 21 is connected to pinion gears 23 installed on an axel shaft 24, and side gears 22 are coupled between the pinion gears 23.

The extension part 122 extends rearwardly from the gear part 121 to the coupler 110. In addition, the extension part 122 has a length corresponding to that of the second bearing 132 so as to install the second bearing 132 and has an outer diameter corresponding to that of the second connection part 113 of the coupler 110, thereby allowing the first and second bearings 131 and 132 to use bearings of the same size.

The shaft coupling part 123 extends from the extension part 122. Splines are formed on an outer circumferential surface of the shaft coupling part 123 so as to be inserted into the second fastening groove 114, thereby achieving spline-coupling to the second connection part 113. In addition, a thread coupling groove 125 is formed at an end of the shaft coupling part 123 so as to allow the fixing bolt 117 to be threaded. If the shaft coupling part 123 is inserted into the second fastening groove 114, the fixing bolt 117 is inserted into a bolt fixing hole 116 through the first fastening groove 112 to be threaded to a thread coupling groove 125 of the shaft coupling part 123, thereby fixing the coupler 110 to the driving bevel gear 120.

The first and second bearings 131 and 132 rotatably support the coupler 110 and the driving bevel gear 120 to the housing 140, respectively.

The first bearing 131 is installed such that an inner wheel 133 is supported to the outer circumferential surface of the second connection part 113 of the coupler 110 and an outer wheel 134 is supported to one surface of the housing 140 positioned between the coupler 110 and the driving bevel gear 120.

The second bearing 132 is installed such that an inner wheel 133 is supported to the outer circumferential surface of the extension part 122 of the driving bevel gear 120 and an outer wheel 134 is supported to the other surface of the housing 140. Therefore, the first bearing 131 and the second bearing 132 are installed at opposite sides of the housing 140 positioned between the coupler 110 and the driving bevel gear 120, thereby supporting the coupler 110 and the driving bevel gear 120 to as to be rotatable with respect to the housing 140.

The first and second bearings 131 and 132 may be taper roller bearings. Rollers are installed between the inner wheels 133 and the outer wheels 134, the rollers extending in the first and second bearings 131 and 132 to be tilted a predetermined angle with respect to centers of rotation of the coupler 110 and the driving bevel gear 120. As the first bearing 131 and the second bearing 132 extend away from the housing 140 to which the outer wheels 134 thereof are supported, they are tilted away from the centers of rotation of the coupler 110 and the driving bevel gear 120.

Since the first and second bearings 131 and 132 rotatably supporting the coupler 110 and the driving bevel gear 120 to the housing 140 are both taper roller bearings, they can stably support the driving bevel gear 120 so as to prevent the driving bevel gear 120 from being separated from the differential gear 21 due to a thrust generated when the driving bevel gear 120 is geared with the differential gear 21 and rotates.

In addition, while the coupler 110 is fixedly coupled to the driving bevel gear 120 by the fixing bolt 117, it is not restrained by the driving axel 11 with respect to the lengthwise direction of the driving axel 11. Accordingly, even if the driving axel 11 is separated from the coupler 110 due to an external force generating during driving, it may slide with respect to its lengthwise direction, thereby preventing a tensile or compressive load from being generated at a rotator of the driving motor 10.

Figure 5:
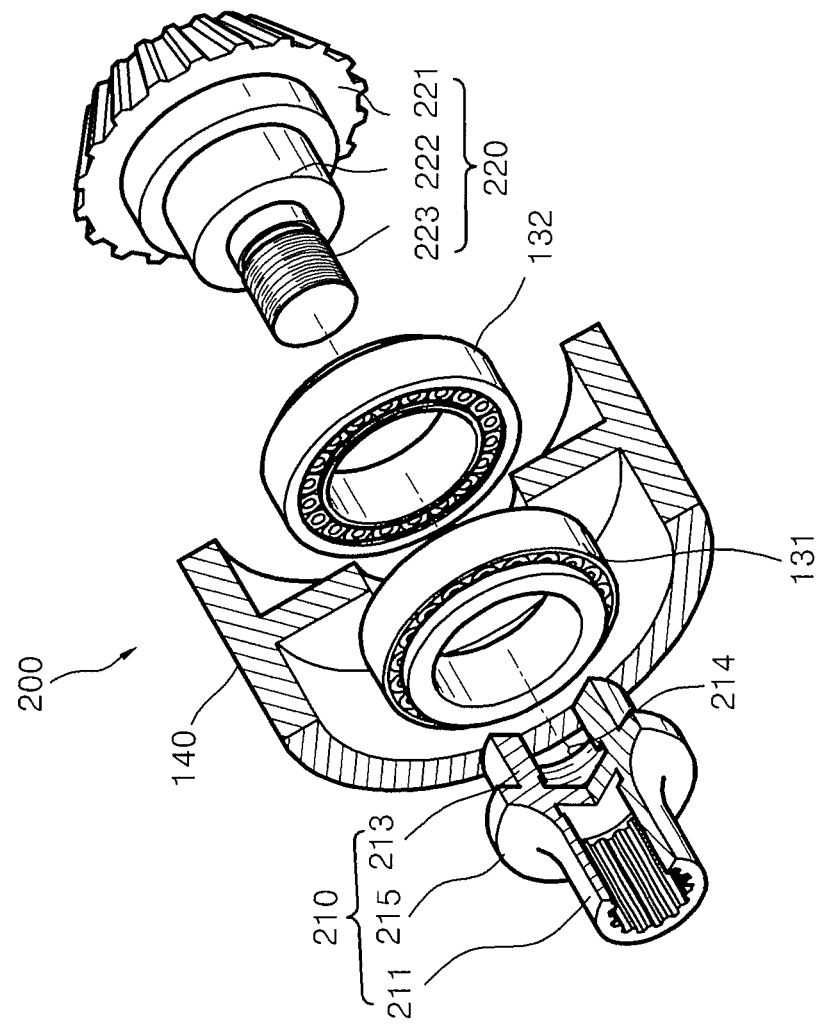
FIG. 5 is an exploded perspective view illustrating a second embodiment of a direct-type driving module of a differential gear for an electric vehicle according to the present invention.
Figure 6:
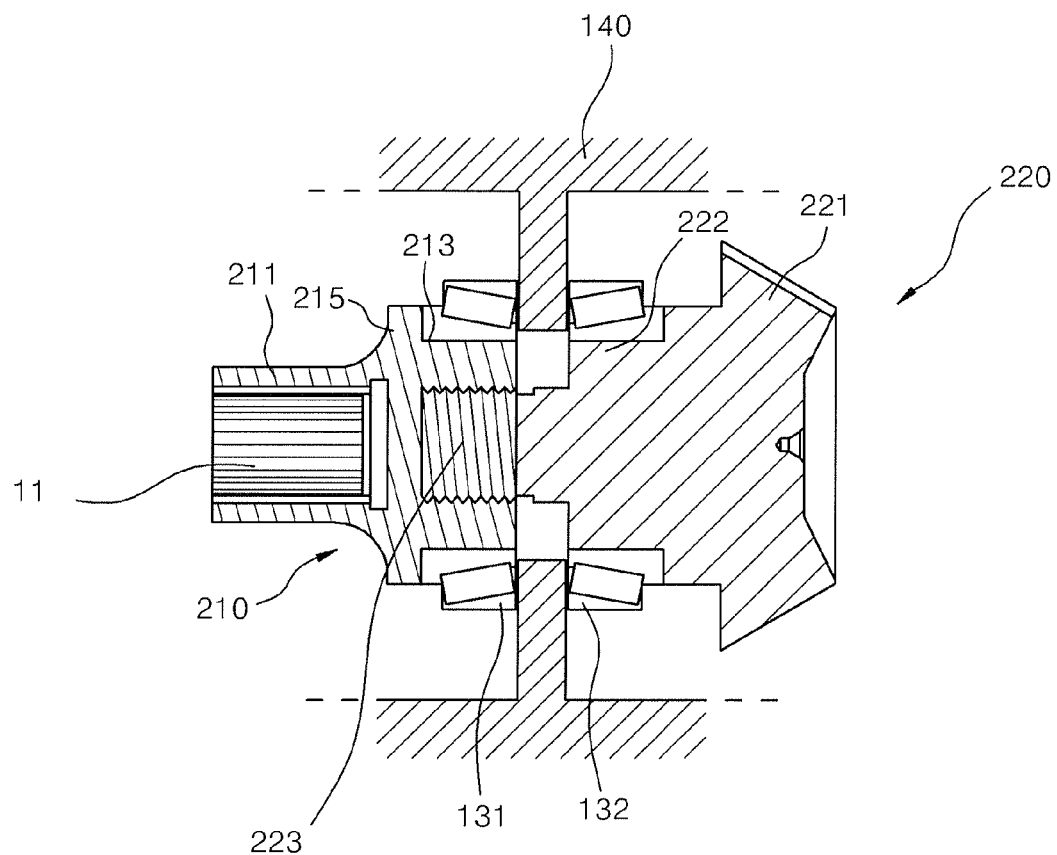
FIG. 6 is a cross-sectional view illustrating the direct-type driving module shown in FIG. 5.

FIGS. 5 and 6 illustrate a second embodiment of a driving module 200 according to the present invention.

In the driving module 200 according to the present embodiment, threads, instead of splines, are formed on an inner circumferential surface of a second fastening groove 214 formed in a second connection part 213 of a coupler 210. In addition, unlike in the first embodiment, a bolt fixing hole is not formed in a supporting part 211.

In addition, threads corresponding to those formed in the second connection part 213 are formed on an outer circumferential surface of a shaft coupling part 223 of a driving bevel gear 220 coupled to a second connection part 213 of the coupler 210.

Therefore, the shaft coupling part 223 is threaded to the second fastening groove 214 so that the coupler 210 and the driving bevel gear 220 are connected to each other. In addition, unlike in the first embodiment, the fixing bolt may not be formed.

The first connection part 211 of the coupler 210 and the extension part 222 of the driving bevel gear 220 are the same as those of the first embodiment.

Figure 7:
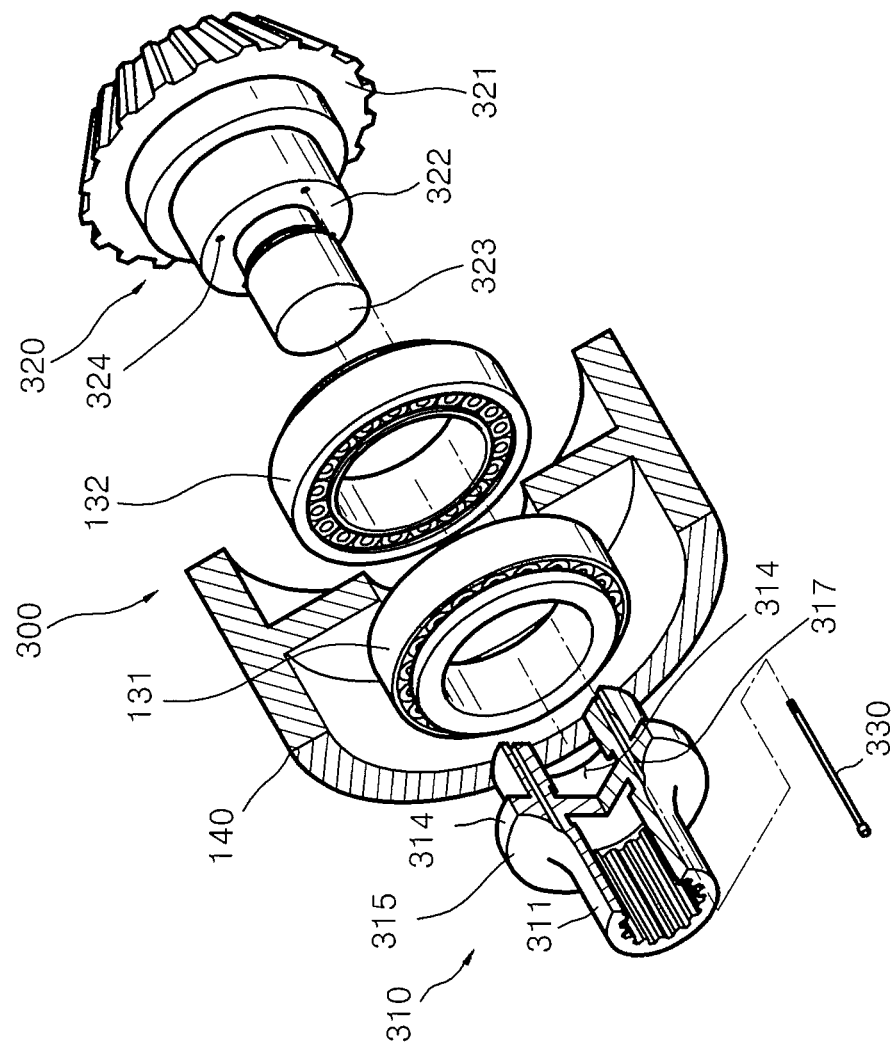
FIG. 7 is an exploded perspective view illustrating a third embodiment of a direct-type driving module of a differential gear for an electric vehicle according to the present invention.
Figure 8:
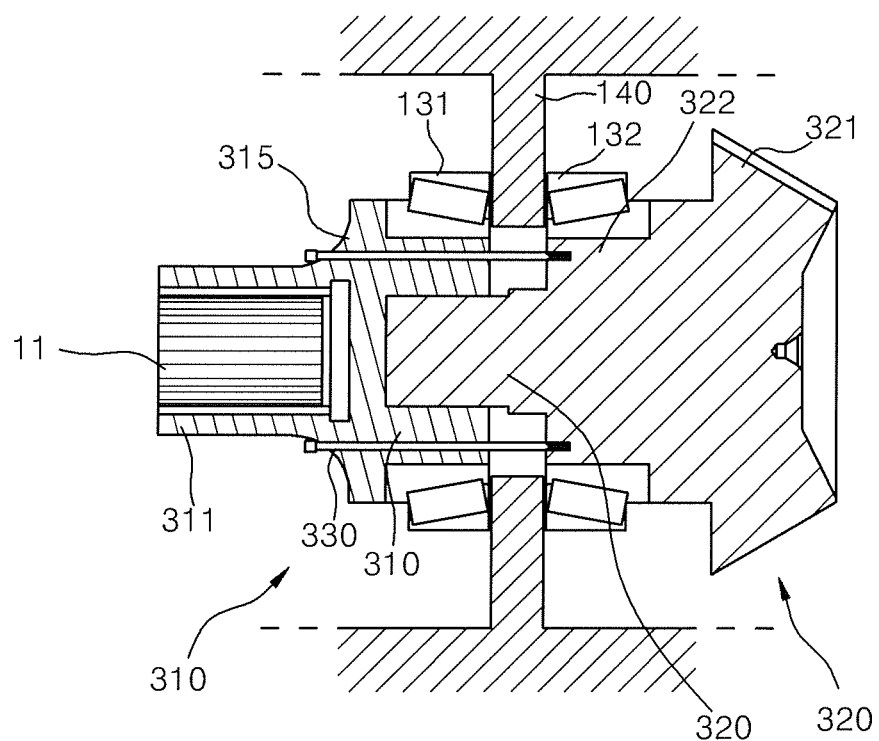
FIG. 8 is a cross-sectional view illustrating the direct-type driving module shown in FIG. 7.

FIGS. 7 and 8 illustrate a third embodiment of a direct-type driving module 300 according to the present invention.

In the driving module 300 according to the present embodiment, four bolt holes 317 penetrating a second connection part 313 of a coupler 310 and a supporting part 315 back and forth are formed, and four bolt fastening grooves 324 located corresponding to the bolt holes 317 are formed on a front surface of an extension part 322 of a driving bevel gear 320. A fixing bolt 330 is inserted so as to penetrate the bolt holes 317 from a front side of the supporting part 315 to then be coupled to a bolt fastening groove 324, thereby connecting the coupler 310 and the driving bevel gear 320 to each other.

In the present embodiment, it is not necessary to form threads or splines on an inner circumferential surface of the second connection part 313 or an outer circumferential surface of the shaft coupling part 323 for the purpose of achieving coupling or power transmission.

Figure 9:
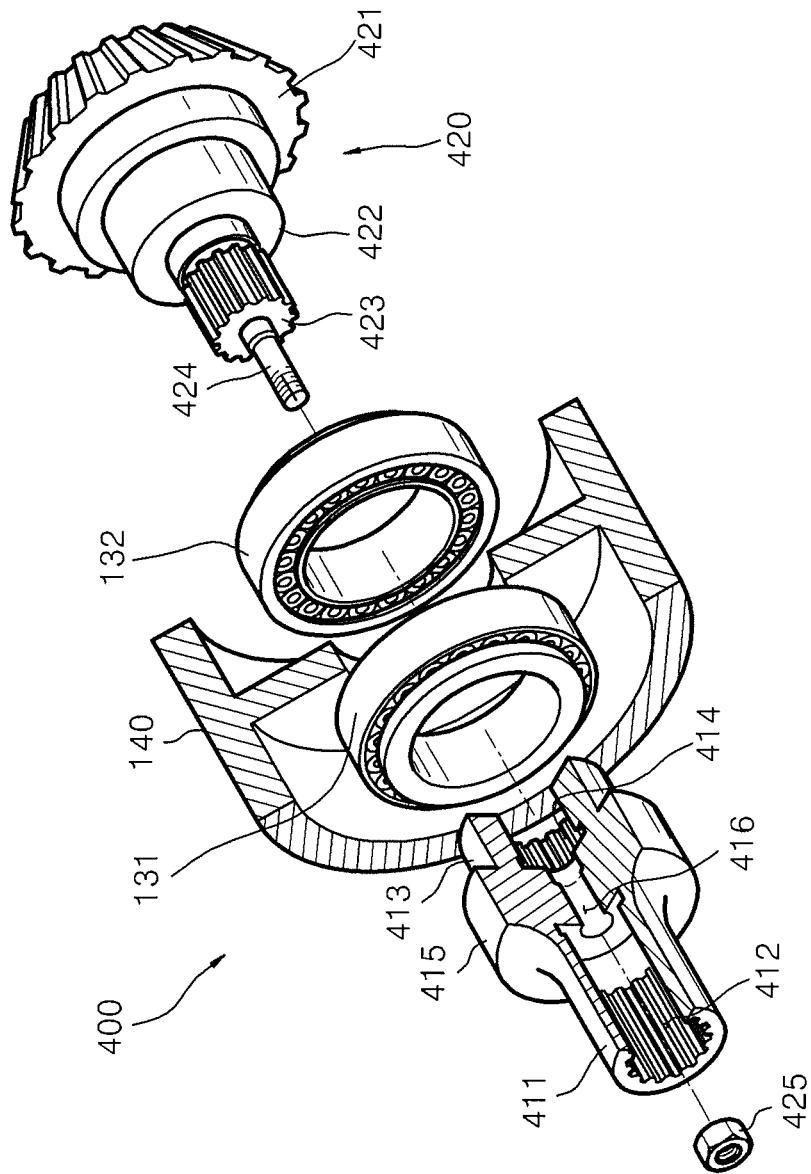
FIG. 9 is an exploded perspective view illustrating a fourth embodiment of a direct-type driving module of a differential gear for an electric vehicle according to the present invention.
Figure 10:
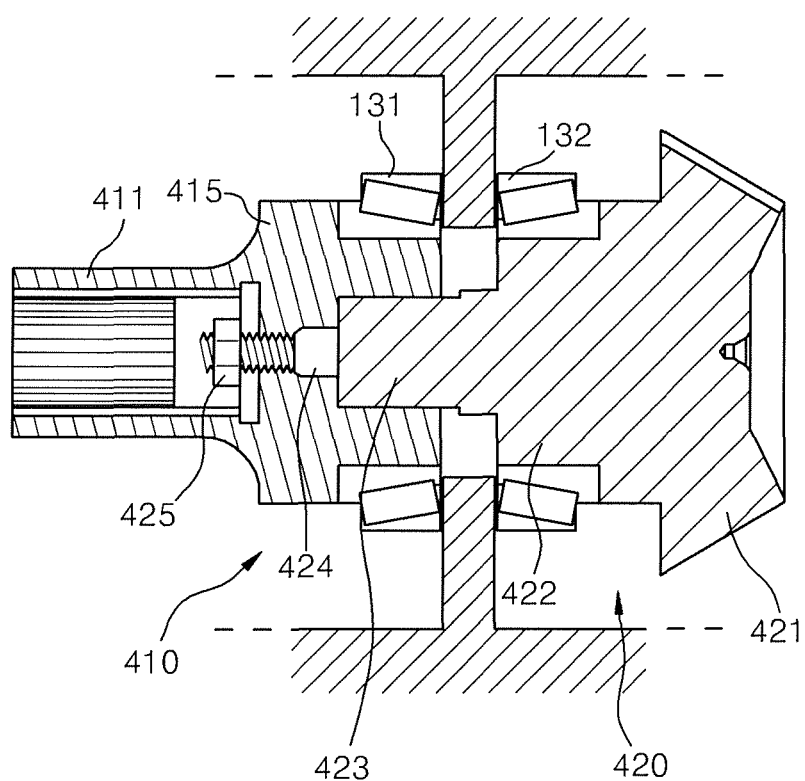
FIG. 10 is a cross-sectional view illustrating the direct-type driving module shown in FIG. 9.

FIGS. 9 and 10 illustrating a fourth embodiment of a driving module 400 according to the present invention.

The driving module 400 according to the present embodiment is substantially the same as the driving module 100 according to the first embodiment in view of configurations of a coupler 420 and a driving bevel gear 420.

However, according to the first embodiment, a bolt hole 416 penetrating a first connection part 411 and a second connection part 413 is formed in a supporting part 415 of the coupler 410, and a fixing bolt 424 is integrally formed with an end of the shaft coupling part 423 of a driving bevel gear 420 and protrudes a predetermined length to the first connection part 411 via the bolt hole 416.

If the fixing bolt 424 protrudes to the first fastening groove 412 of the first connection part 411, a nut 425 is fastened to the protruding end of the fixing bolt 424, thereby connecting the driving bevel gear 420 and the coupler 410 to each other.

Like in the first embodiment, splines are formed on an inner circumferential surface of the second fastening groove 414 of the second connection part 413 and an outer circumferential surface of the shaft coupling part 423 for the purpose of achieving power transmission.

Figure 11:
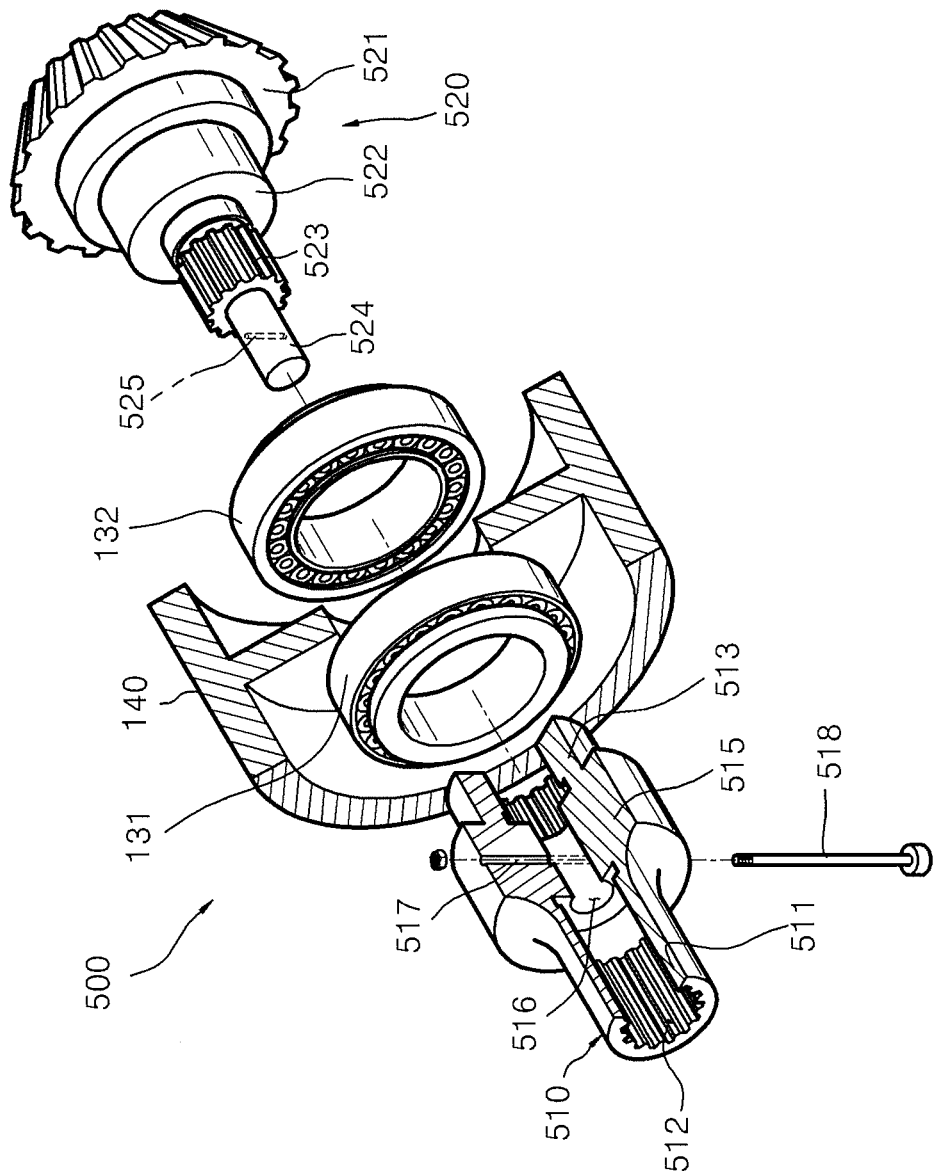
FIG. 11 is an exploded perspective view illustrating a fifth embodiment of a direct-type driving module of a differential gear for an electric vehicle according to the present invention.
Figure 12:
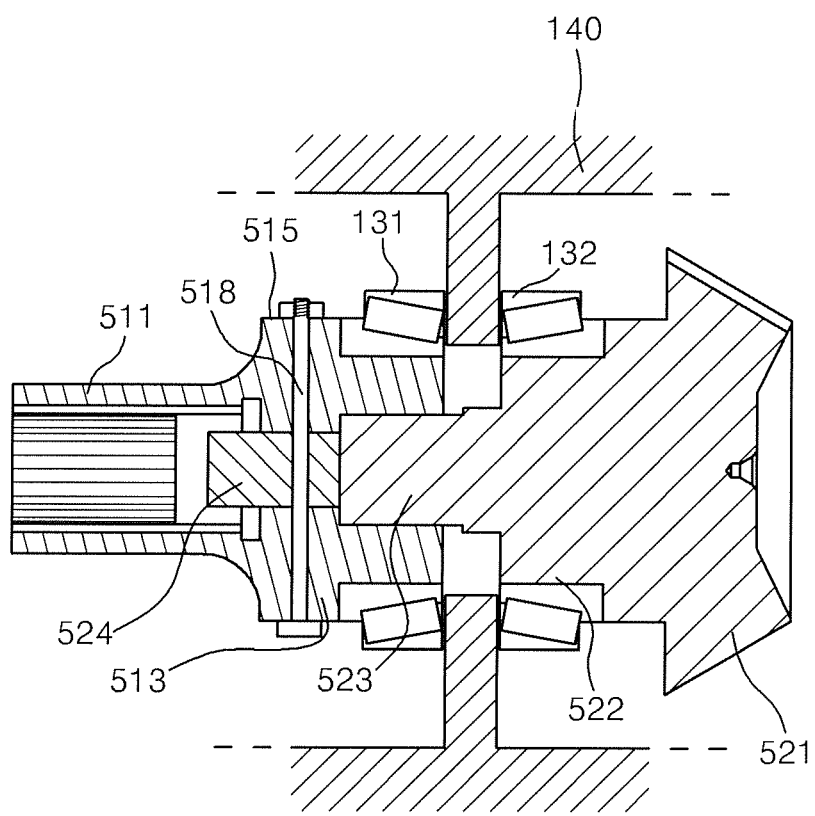
FIG. 12 is a cross-sectional view illustrating the direct-type driving module shown in FIG. 11.

FIGS. 11 and 12 illustrate a fifth embodiment of a driving module 500 according to the present invention.

In the driving module 500 according to the present embodiment, an insertion hole 516 penetrating a first connection part 511 and a second connection part 513 extends in an axial direction in a supporting part 515 of a coupler 510, and a protrusion member 524 having a outer diameter corresponding to a diameter of the insertion hole 516 is formed at an end of a shaft coupling part 523 of a driving bevel gear 520 so as to be inserted into the insertion hole 516. In addition, a pin insertion hole 525 penetrating an outer circumferential surface of the protrusion member 524 is formed to pass through the center of rotation of the protrusion member 524.

In addition, a throughhole 517 is formed in the coupler 510 to pass through the center of rotation of the coupler 510 from an outer circumferential surface of a supporting part 515.

According to the present embodiment, if the driving bevel gear 520 is inserted into the coupler 510, the protrusion member 524 is fitted into the insertion hole 516, the pin insertion hole 525 is tuned so as to extend in a line with the throughhole 517, and then the fixing pin 518 is inserted to pass through the throughhole 517 and the pin insertion hole 525, thereby coupling the driving bevel gear 520 to the coupler 510 so as not to be separated from each other.

As described above, in the driving modules 200 to 500 according to the second to fifth embodiments, the first and second bearings 131 and 132 are all provided in the respective embodiments and are the same as those of the first embodiment. Thus, the same components are denoted by the same reference numerals and detailed descriptions thereof will be omitted.

Since rapid development of electric vehicles is currently under way, the direct-type driving module of a differential gear for an electric vehicle according to the present invention can be very highly applicable in industrial fields of the related art.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A direct-type driving module of a differential gear for an electric vehicle, comprising:
   a driving bevel gear connected to enable power transmission with respect to a differential gear of a differential device, the driving bevel gear including a shaft coupling part having splines formed on an outer circumferential surface of the shaft coupling part;
   a coupler having a first connection part provided at a first side and a second connection part provided at a second side opposite the first side, the first connection part having a first fastening groove that is inwardly recessed along a length wise direction of the coupler and has splines formed on an inner circumferential surface of the first fastening groove so as to be spline-coupled to a driving axel of a driving motor, and the second connection part having a second fastening groove that is inwardly recessed along the length wise direction of the coupler and has splines formed on an inner circumferential surface of the second fastening groove so as to be spline-coupled to the shaft coupling part of the driving bevel gear, wherein the splines of the first fastening groove and the second fastening groove have recesses and protrusions alternately arranged along a circumferential direction of the first fastening groove and the second fastening groove and stretched along the length wise direction of the coupler;
   a first bearing installed at the coupler and having an inner wheel supported to the coupler and an outer wheel supported to a housing of the differential device;
   a second bearing installed at the driving bevel gear and having an inner wheel supported to the driving bevel gear and an outer wheel supported to a housing of the differential device; and
   a fastening part connecting the coupler and the driving bevel gear to each other,
   wherein the first and second bearings are supported to one and the other surfaces of the housing to be mounted at opposite sides facing each other,
   the coupler includes a supporting part that has a larger diameter than the second connection part and is disposed between the first connection part and the second connection part so as to support the first bearing installed on an outer circumferential surface of the second connection part, and
   the spline-connection between the first fastening groove of the first connection part of the coupler and the driving axel of a driving motor is not restrained with respect to the lengthwise direction of the driving axel so that the driving axel may slide with respect to its lengthwise direction.

2. The direct-type driving module of claim 1, wherein the fastening part includes a fixing bolt thread-coupled to the driving bevel gear inserted into the second fastening groove from the first fastening groove through bolt fixing holes allowing the first and second fastening grooves to communicate with each other.

3. The direct-type driving module of claim 2, wherein the first bearing and the second bearing are taper roller bearings and are tapered such that rollers of the first bearing and the second bearing are away from centers of rotation of the coupler and the driving bevel gear as they extend to be away from the housing.

4. The direct-type driving module of claim 1, wherein the fastening part includes a fixing bolt extending from a shaft coupling part of the driving bevel gear inserted into the second fastening groove through bolt holes allowing the first and second fastening grooves to communicate with each other, and a nut thread-coupled to an end of the fixing bolt and exposed to the first fastening groove via the bolt hole.

5. The direct-type driving module of claim 4, wherein the first bearing and the second bearing are taper roller bearings and are tapered such that rollers of the first bearing and the second bearing are away from centers of rotation of the coupler and the driving bevel gear as they extend to be away from the housing.

6. The direct-type driving module of claim 1, wherein the fastening part includes a protrusion member inserted into an insertion hole recessed from an end of the second fastening groove to the first fastening groove, extending from a shaft coupling part of the driving bevel gear inserted into the second fastening groove and having a pin insertion hole formed orthogonal to an extending direction of the insertion hole, and a fixing pin for fixing the protrusion member to the coupler while penetrating the coupler in the extending direction of the pin insertion hole so as to penetrate the pin insertion hole of the protrusion member inserted into the insertion hole.

7. The direct-type driving module of claim 6, wherein the first bearing and the second bearing are taper roller bearings and are tapered such that rollers of the first bearing and the second bearing are away from centers of rotation of the coupler and the driving bevel gear as they extend to be away from the housing.

8. The direct-type driving module of claim 1, wherein the first bearing and the second bearing are taper roller bearings and are tapered such that rollers of the first bearing and the second bearing are away from centers of rotation of the coupler and the driving bevel gear as they extend to be away from the housing.

9. A direct-type driving module of a differential gear for an electric vehicle, comprising:
   a driving bevel gear connected to enable power transmission with respect to a differential gear of a differential device, wherein the driving bevel gear includes an extension part having a plurality of first bolt holes arranged along a circumferential direction of the extension part and a shaft coupling part that is extended from the extension part and has a smaller diameter than the extension part;
   a coupler having a first connection part provided at a first side, a second connection part provided at a second side opposite the first side, and a supporting part having a larger diameter than the second connection part and disposed between the first connection part and the second connection part, wherein the first connection part has a first fastening groove that is inwardly recessed along a length wise direction of the coupler and has splines formed on an inner circumferential surface of the first fastening groove so as to be spline-coupled to a driving axel of a driving motor, wherein the second connection part has a second fastening groove that is inwardly recessed along the lengthwise direction of the coupler and accommodates the shaft coupling part, and wherein the second connection part and the supporting part have a plurality of second bolt holes penetrating thereof;

a first bearing installed at the coupler and having an inner wheel supported to the coupler and an outer wheel supported to a housing of the differential device;

a second bearing installed at the driving bevel gear and having an inner wheel supported to the driving bevel gear and an outer wheel supported to the housing of the differential device; and a plurality of fixing bolts inserted in the first bolt holes through the second bolt holes to connect the coupler and the driving bevel gear to each other, wherein the first and second bearings are supported to one and the other surfaces of the housing to be mounted at opposite sides facing each other, the supporting part supports the first bearing to stay on an outer circumferential surface of the second connection part along with the housing, and the spline-connection between the first fastening groove of the first connection part of the coupler and the driving axel of a driving motor is not restrained with respect to the lengthwise direction of the driving axel so that the driving axel may slide with respect to its lengthwise direction.

* * * * *